US009274959B2

(12) United States Patent
Habermann et al.

(10) Patent No.: US 9,274,959 B2
(45) Date of Patent: Mar. 1, 2016

(54) HANDLING VIRTUAL MEMORY ADDRESS SYNONYMS IN A MULTI-LEVEL CACHE HIERARCHY STRUCTURE

(71) Applicant: GLOBALFOUNDRIES Inc., Grand Cayman (KY)

(72) Inventors: Christian Habermann, Boeblingen (DE); Christian Jacobi, Poughkeepsie, NY (US); Gerrit Koch, Ammerbuch (DE); Martin Recktenwald, Schonaich (DE); Hans-Werner Tast, Weil im Schoenbuch (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 14/335,230

(22) Filed: Jul. 18, 2014

(65) Prior Publication Data

US 2015/0032964 A1    Jan. 29, 2015

(30) Foreign Application Priority Data

Jul. 24, 2013 (GB) .................................. 1313191.7

(51) Int. Cl.
*G06F 12/08* (2006.01)
*G06F 12/10* (2006.01)
*G06F 12/12* (2006.01)

(52) U.S. Cl.
CPC ........ *G06F 12/0811* (2013.01); *G06F 12/0848* (2013.01); *G06F 12/0897* (2013.01); *G06F 12/1063* (2013.01); *G06F 12/123* (2013.01); *G06F 2212/1024* (2013.01)

(58) Field of Classification Search
CPC ............ G06F 12/0897; G06F 12/0811; G06F 12/0831
USPC ......................................................... 711/122
See application file for complete search history.

(56) References Cited

U.S. PATENT DOCUMENTS

| 5,668,968 | A |   | 9/1997  | Wu |
| 5,694,573 | A | * | 12/1997 | Cheong ............... G06F 12/0811 711/122 |
| 6,751,720 | B2 |  | 6/2004  | Barruso et al. |

(Continued)

OTHER PUBLICATIONS

International Search Report for GB1213191.7 dated Jan. 9, 2014, 3 pages.

*Primary Examiner* — Jared Rutz
*Assistant Examiner* — Khoa D Doan
(74) *Attorney, Agent, or Firm* — Heslin Rothenberg Farley & Mesiti P.C.

(57) ABSTRACT

Handling virtual memory address synonyms in a multi-level cache hierarchy structure. The multi-level cache hierarchy structure having a first level, L1 cache, the L1 cache being operatively connected to a second level, L2 cache split into a L2 data cache directory and a L2 instruction cache. The L2 data cache directory including directory entries having information of data currently stored in the L1 cache, the L2 cache being operatively connected to a third level, L3 cache. The first level cache is virtually indexed while the second and third levels are physically indexed. Counter bits are allocated in a directory entry of the L2 data cache directory for storing a counter number. The directory entry corresponds to at least one first L1 cache line. A first search is performed in the L1 cache for a requested virtual memory address, wherein the virtual memory address corresponds to a physical memory address tag at a second L1 cache line.

20 Claims, 4 Drawing Sheets

(56) References Cited

U.S. PATENT DOCUMENTS

| | | | |
|---|---|---|---|
| 6,772,315 B1* | 8/2004 | Perego | G06F 12/1027 711/117 |
| 8,041,894 B2* | 10/2011 | Krumm | G06F 12/0811 711/122 |
| 2003/0023814 A1* | 1/2003 | Barroso | G06F 12/0826 711/122 |
| 2009/0216949 A1 | 8/2009 | Krumm et al. | |
| 2010/0174842 A1* | 7/2010 | Kimelman | G06F 11/073 710/267 |
| 2013/0013866 A1* | 1/2013 | Hsu | G06F 12/12 711/136 |
| 2014/0129773 A1* | 5/2014 | Habermann | G06F 12/0811 711/122 |
| 2014/0129774 A1* | 5/2014 | Habermann | G06F 12/0811 711/122 |
| 2014/0258621 A1* | 9/2014 | Bronson | G06F 12/0811 711/122 |
| 2014/0258623 A1* | 9/2014 | Meredith | G06F 12/0804 711/122 |
| 2014/0281238 A1* | 9/2014 | Habermann | G06F 12/0811 711/122 |

* cited by examiner

US 9,274,959 B2

HANDLING VIRTUAL MEMORY ADDRESS SYNONYMS IN A MULTI-LEVEL CACHE HIERARCHY STRUCTURE

PRIOR FOREIGN APPLICATION

This application claims priority from United Kingdom patent application number 1313191.7, filed Jul. 24, 2013, which is hereby incorporated herein by reference in its entirety.

BACKGROUND

One or more aspects of the invention relate to computing systems, and more particularly, to a multi-level cache hierarchy structure.

Computer systems involving multilevel cache hierarchy structures have become areas of particular interest and technology growth in recent years. Operating such caches to maximize processing performances while maintaining the cache coherence of the composite systems is a requirement.

BRIEF SUMMARY

One aspect relates to a method for handling virtual memory address synonyms in a multi-level cache hierarchy structure, the multi-level cache hierarchy structure comprising a first level, L1, cache, the L1 cache being operatively connected to a second level, L2, cache split into a L2 data cache directory and a L2 instruction cache, wherein the L2 data cache directory comprises directory entries comprising information of data currently stored in the L1 cache, the L2 cache being operatively connected to a third level, L3, cache, wherein the first level cache is virtually indexed while the second and third levels are physically indexed. The L2 data cache is a directory-only-cache.

The method comprises, for instance, allocating counter bits in a directory entry of the L2 data cache directory for storing a counter number, wherein the directory entry corresponds to at least one first L1 cache line; performing a first search in the L1 cache for a requested virtual memory address, wherein the virtual memory address corresponds to a physical memory address tag at a second L1 cache line; in case the first search results in a cache miss, performing a second search in the L2 cache to locate a synonym index of a synonym L1 cache line corresponding to the requested virtual memory address in the L2 data cache directory, wherein the synonym L1 cache line is the at least one first L1 cache line; in case the second search results in a cache hit, a. sending a fetch request to the L3 cache for fetching contents of the synonym L1 cache line from the L3 cache, thereby incrementing the counter number;

b. invalidating the synonym L1 cache line in the directory entry and in a L1 directory entry of the L1 cache corresponding to the synonym L1 cache line;

c. copying the fetched contents to the second L1 cache line;

In response to a determination that the counter number is equal to a predetermined maximum number of synonyms, d. copying the contents of the synonym L1 cache line to the instruction cache of the L2 cache, thereby redirecting a subsequent fetch request to the L2 instruction cache for fetching the contents of the synonym L1 cache line from the L2 instruction cache and for subsequently executing steps b) and c).

BRIEF DESCRIPTION OF THE SEVERAL VIEWS OF THE DRAWINGS

In the following, embodiments of aspects of the invention will be described in greater detail by way of example only making reference to the drawings in which.

DETAILED DESCRIPTION

The term "instruction cache" as used herein refers to a cache for providing program instructions to the processor faster than they can be obtained from the main memory.

The term "data cache" as used herein refers to a cache for providing data to the processor faster than it can be obtained from the main memory.

A synonym of a requested cache line has the same physical address as the requested cache line, but is stored at a different cache index of the L1 cache than the index corresponding to the specified virtual address of the cache line.

In the following, like numbered elements in the figures either designate similar elements or designate elements that perform an equivalent function. Elements which have been discussed previously will not necessarily be discussed in later figures if the function is equivalent.

Figure 1:
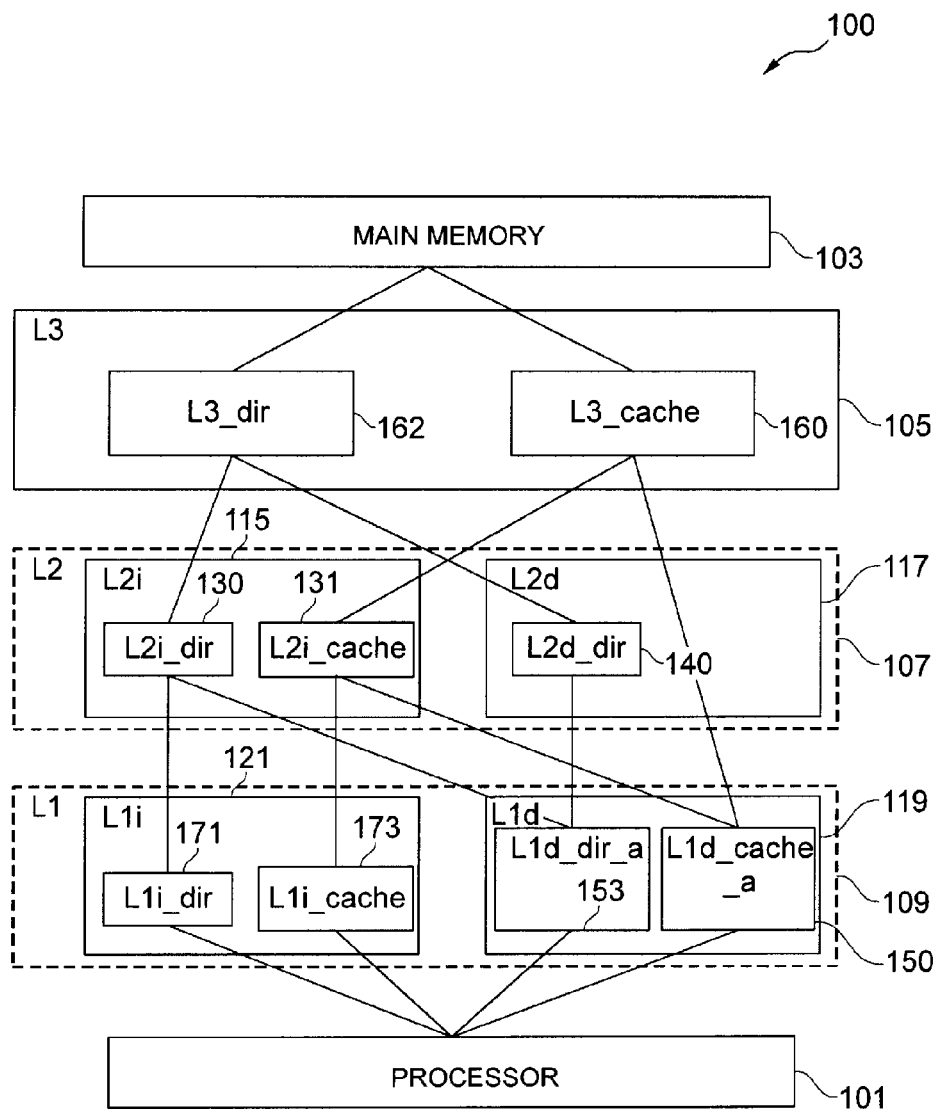
FIG. 1 is a schematic block diagram of an exemplary hierarchical cache structure, in accordance with an embodiment of the present invention.

FIG. 1 depicts an exemplary hierarchical cache structure 100, arranged between a processor 101 and a main memory 103. The hierarchical cache structure 100 comprises three level caches, a L1 cache, L2 cache and L3 cache. The L3 cache 105 is a physical or real indexed cache. The L3 cache 105 comprises a directory L3_dir 162 for the unified cache array L3_cache 160. The two lower level caches, L1 cache 109 and L2 cache 107 are each split in an instruction cache L1i 121, L2i 115 and a data cache L1d 119, L2d 117. The L1 instruction cache L1i 121 comprises a directory L1i_dir 171, a corresponding cache array L1i_cache 173. The instruction cache L2i 115 comprises a directory (L2i_dir) 130 and a corresponding cache array (L2i_cache) 131 connected to the real indexed L3 cache 105. The data cache L2d 117 of the split L2 cache 107 is a directory-only-cache without a cache array comprising a directory (L2d_dir) 140 connected to the L3 cache 105. The L1 instruction cache, L1i 121, of the split virtually indexed L1 cache 109 is connected to the second level instruction cache, L2i 115, and a cache array (L1d_cache_a) 150 of a data cache (L1d) 119 of the virtually indexed first level cache (L1) 109 is connected to the cache array (L2i_cache) 131 of the second level instruction cache (L2i) 115 and to the cache array (L3_cache) 160 of the real indexed third level cache (L3) 105. A directory (L1d_dir_a) 153 of the first level data cache (L1d) 119 is connected to the second level instruction cache directory (L2i_dir) 130, and to the third level cache directory (L3_dir) 162 via, e.g., 130 or 140.

Figure 2:
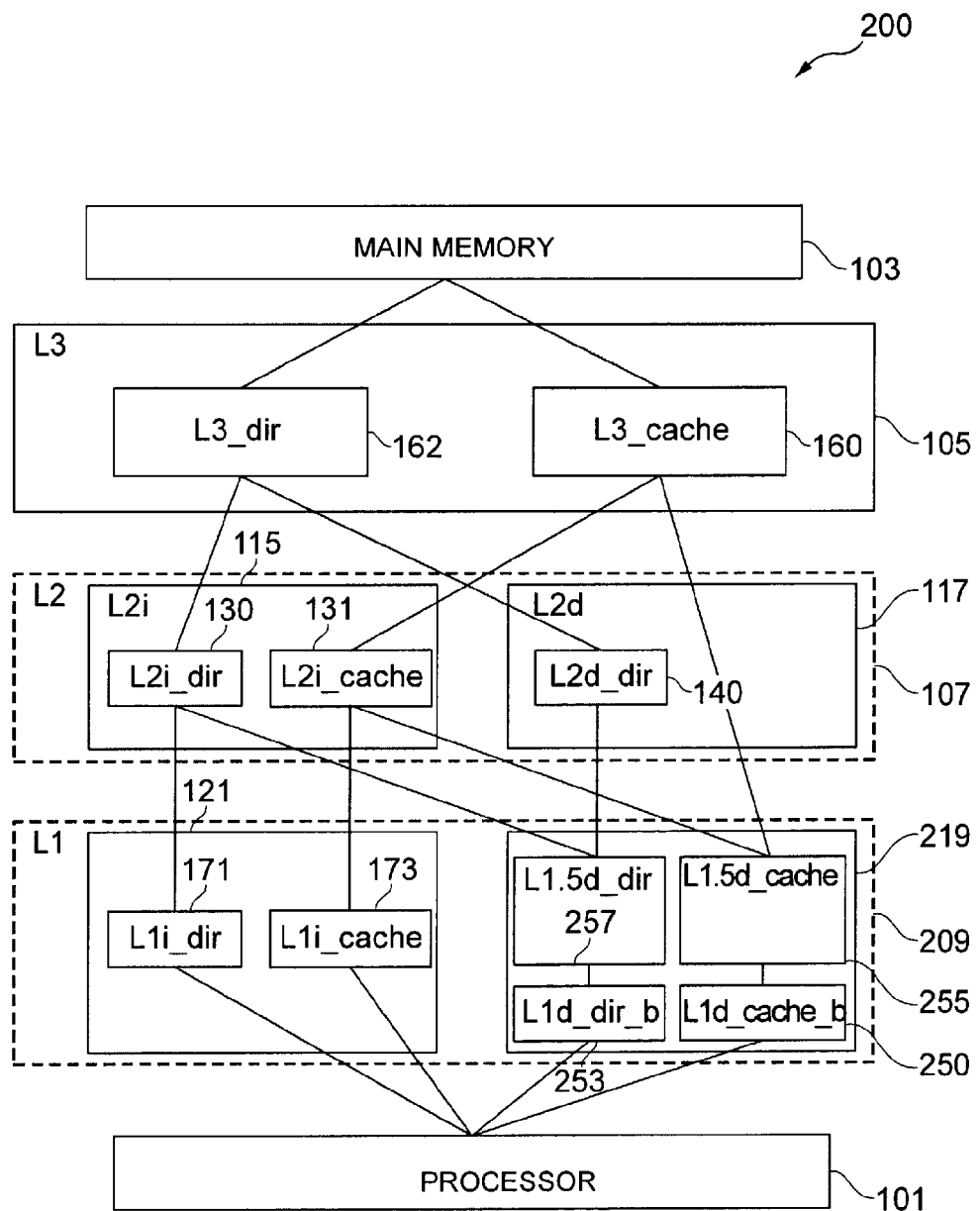
FIG. 2 is a schematic block diagram of a further exemplary hierarchical cache structure, in accordance with an embodiment of the present invention.

FIG. 2 shows a further exemplary hierarchical cache structure 200 arranged between a processor 101 and a main memory 103. The hierarchical cache structure 200 comprises three level caches. A real indexed L3 cache 105 comprises a directory (L3_dir) 162 and a unified cache array (L3_cache)

160 for data and instructions, and two lower level caches (L1) 209, (L2) 107 are each split in an instruction cache (L1i) 121, (L2i) 115 and a data cache (L1d) 219, (L2d) 117. The L2 instruction cache (L2i) 115 comprises a directory (L2i_dir) 130 and a corresponding cache array (L2i_cache) 131 connected to the L3 cache 105. The L2 data cache L2d 117 comprises a directory (L2d_dir) 140 connected to the third level cache (L3) 105. The L1 instruction cache (L1i) 121 is connected to the L2 instruction cache (L2i) 115. The L1 data cache (L1d_b) 219 is implemented as a two level structure comprising a first cache array (L1d_cache_b) 250 with a first directory (L1d_dir_b) 253, and a second cache array (L1.5d_cache) 255 with a second directory (L1.5d_dir) 257. Both levels of the L1 data cache (L1d) 219 are virtually indexed. The second cache array (L1.5d_cache) 255 of the L1 data cache (L1d_b) 219 may be a cache array (L2d_cache) of a second level data cache (L2d) 117 with virtual indexing. The second cache array (L1.5d_cache) 255 is connected to the L3 cache array (L3_cache) 160 of the L3 cache 105 and to the L2 instruction cache (L2i) 115. The second cache array (L1.5d_cache) 255 of the L1 data cache (L1d_b) 219 may receive data from the L2 instruction cache (L2i) 115 or from the L3 cache 105. A second directory (L1.5d_dir) 257 of the L1 data cache (L1d_b) 219 is connected to the L2 instruction cache directory (L2i_dir) 130, and to the L3 cache directory (L3_dir) 162 via, e.g., 130 or 140. The system structure of FIG. 2 may allow fast access to the second cache array (L1.5d) 255 of the L1 data cache (L1d) 219 in case of a miss in the L1 cache array (L1d_cache) 250 of the L1 data cache (L1d) 219. It does not have to wait for the translation lookaside buffer read before the second cache array (L1.5d_cache) 255 of the L1 data cache (L1d) 219 can be accessed. Therefore the access to the second cache array (L1.5d_cache) 255 of the L1 data cache (L1d) 219 is faster which results in a better performance in case of a miss in the L1 cache array (L1d_cache) 250 of the L1 data cache (L1d) 219 and a hit in the second cache array (L1.5d_cache) 255 of the L1 data cache (L1d) 219. The extra directory (L2d_dir) 140 of the second level data cache (L2d) 117 is used for the synonyms to the virtual index of the second cache array (L1.5d_cache) 255 of the first level data cache (L1d) 219.

Figure 3:
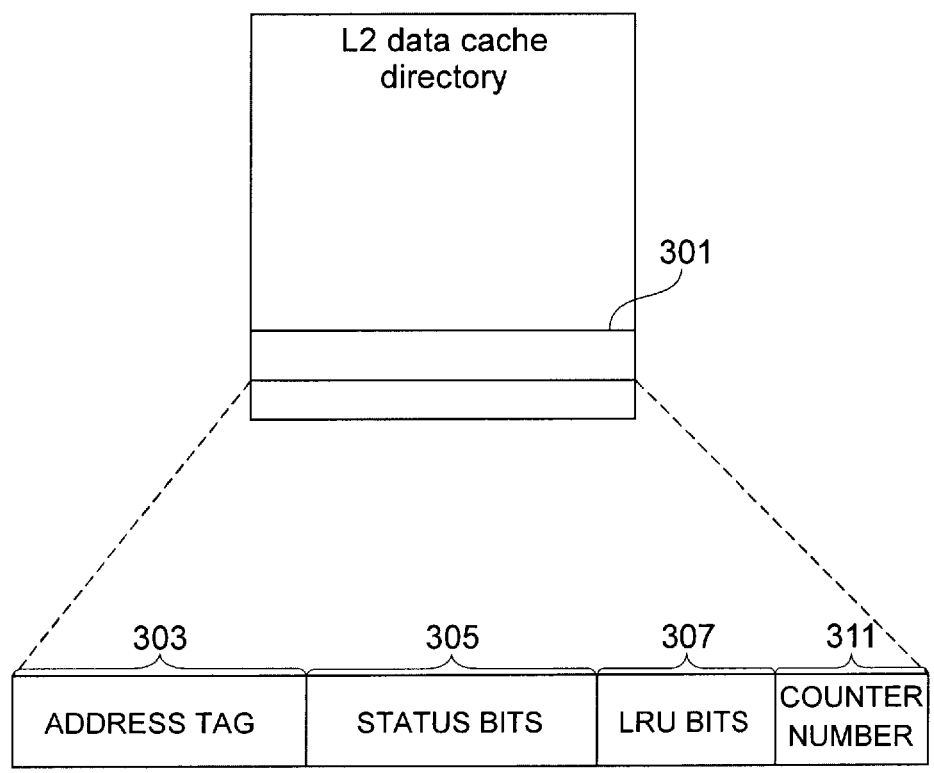
FIG. 3 is an exemplary structure of a directory entry in accordance with an embodiment of the present invention.

FIG. 3 depicts an exemplary organization of a cache directory entry format 301 for each cache line within L2 data cache directory 140. The cache directory entry format 301 includes address tag 303, status bits 305 that identify a coherency state for the corresponding cache line and LRU bits 307. The LRU bits are indicative of a least recently used cache line for data replacement. In addition, cache directory entry format 301 includes a succession of two extra bits 311, per cache line. Those skilled in the art will easily understand that it may be generalized to less or more than two extra bits. These bits are appended, as schematically depicted in FIG. 3, to the tag bits 303, status bits 305 and LRU bits 307. The two extra bits may be used for storing a counter number. The counter number is incremented by one responsive to the detection of a synonym mismatch in the multi-level cache hierarchy structure 100 or 200.

By the above scheme, the L2 directory may always, in one embodiment, keep track of precisely the number of synonym mismatches that a cache line experienced. The size for this counter of 2 bits may allow counting up to the fourth synonym mismatch before a cache line is considered a synonym thrashing victim i.e. reached a maximum number of synonym mismatches.

Figure 4:
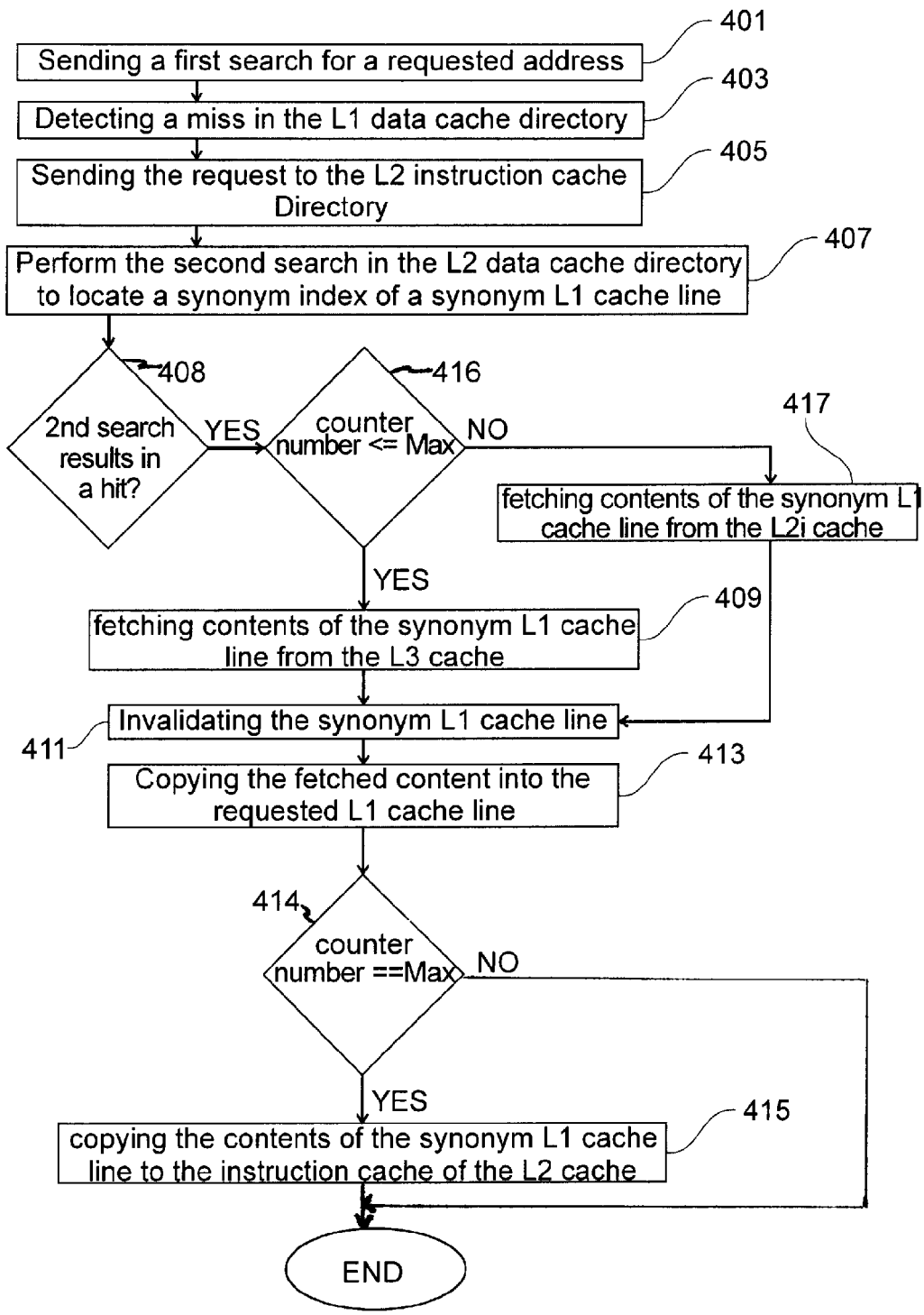
FIG. 4 is a flowchart of a method for handling virtual memory address synonyms.

Referring to FIG. 4, the processor 101 requests a virtual memory address corresponding to a physical memory address tag at a L1 cache line data from the first level data cache (L1 d) 119. Therefore, in step 401, the processor 101 sends a first search for the requested address to the directory (L1d_dir_a) 153 of the first level data cache (L1 d) 119. The directory (L1d_dir_a) 153 detects a miss in step 403 and sends the request to the directory (L2i_dir) 130 of the second level instruction cache (L2i) in step 405. If the requested cache-line is in the second level instruction cache (L2i) 115, both, the first level instruction cache (L1i) 121 and the first level data cache (L1d) 119 will fetch it from there.

In case of a miss in the directory (L2i_dir) 130 of the L2 instruction cache (L2i) the L2 data cache (L2d) 117 may forward the request of the L1 data cache (L1d) 119 to the L3 cache (L3) 105 for fetching contents of the synonym L1 cache line from the L3 cache. And a second search in parallel to the search in L2 instruction cache directory in the L2d_dir data cache directory is performed in step 407 to locate a synonym index of a synonym L1 cache line corresponding to the requested virtual memory address. In an alternative example, the second search in L2d_dir and the search in the L2 instruction cache may be performed sequentially. For example, the second search in L2d_dir may be performed after performing the search in the L2 instruction cache. If the second search in the directory (L2d_dir) 140 of the L2 data cache (L2d) 117 results in a cache hit, INQUIRY 408 (and in one embodiment a counter number, described below, is less than or equal to max in INQUIRY 416), the contents of the synonym L1 cache line is fetched from the L3 cache in step 409, the synonym L1 cache-line is invalidated in the directory (L2d_dir) 140 of the second level data cache (L2d) 117 and also in the L1 data cache (L1d) 119 in step 411. When the contents of the synonym L1 cache line is fetched from the L3 cache, the counter number is incremented, for example, by one, and then stored in the two additional bits 311.

For any fetches to L3 cache where the LRU target is the L2d directory, but it was not a synonym mismatch case as above a field containing the counter number in a L3 fetch control register of the L2 cache is set to zero. This ensures that any newly installed line will have a correctly initialized synonym ping-pong counter or counter number in the L2d directory (L2d_dir).

In step 413, the fetched content is copied into the requested L1 cache line.

In response to a determination that the counter number is equal to a predetermined maximum number of synonym mismatches, INQUIRY 414, copying, in step 415, the fetched contents of the synonym L1 cache line to the instruction cache of the L2 cache, thereby redirecting a subsequent (i.e. when the counter number is higher than the predetermined maximum number), INQUIRY 416, fetch request to the L2 instruction cache in step 417 for fetching the contents of the synonym L1 cache line from the L2 instruction cache and for subsequently executing steps 411 and 413. The copying of step 415 may be done, for example, by modifying the LRU bits 307 of the directory entry 301 for indicating a cache line of the L2i cache as a replacement cache line.

The predetermined maximum number of synonym mismatches may be determined using simulation based on a model of the multi-level architecture structures described above. For example, the multi-level architecture structure may be tested using multiple different maximum number of synonym mismatches, and the resulting multiple performances for example in term of I/O throughput may be compared against each other and the maximum number of synonym mismatches that corresponds to the best performance e.g. lowest I/O throughput may be selected/used.

In case of architecture 200, in step 401, the processor 101 sends a first search for the requested address to the directory (L1d_dir_b) 253 of the first level data cache 219. The directory (L1d_dir_b) 253 detects a miss in step 403 and forwards the request to L1.5d_dir and the L1.5d_dir detects a miss and sends the request to the directory (L2i_dir) 130 of the second level instruction cache (L2i) in step 405.

One aspect relates to a method for handling virtual memory address synonyms in a multi-level cache hierarchy structure, the multi-level cache hierarchy structure comprising a first level, L1, cache, the L1 cache being operatively connected to a second level, L2, cache split into a L2 data cache directory and a L2 instruction cache, wherein the L2 data cache directory comprises directory entries comprising information of data currently stored in the L1 cache, the L2 cache being operatively connected to a third level, L3, cache, wherein the first level cache is virtually indexed while the second and third levels are physically indexed. The L2 data cache is a directory-only-cache.

The method comprises, for instance, allocating counter bits in a directory entry of the L2 data cache directory for storing a counter number, wherein the directory entry corresponds to at least one first L1 cache line; performing a first search in the L1 cache for a requested virtual memory address, wherein the virtual memory address corresponds to a physical memory address tag at a second L1 cache line; in case the first search results in a cache miss, performing a second search in the L2 cache to locate a synonym index of a synonym L1 cache line corresponding to the requested virtual memory address in the L2 data cache directory, wherein the synonym L1 cache line is the at least one first L1 cache line; in case the second search results in a cache hit,
 a. sending a fetch request to the L3 cache for fetching contents of the synonym L1 cache line from the L3 cache, thereby incrementing the counter number;
 b. invalidating the synonym L1 cache line in the directory entry and in a L1 directory entry of the L1 cache corresponding to the synonym L1 cache line;
 c. copying the fetched contents to the second L1 cache line;
In response to a determination that the counter number is equal to a predetermined maximum number of synonyms,
 d. copying the contents of the synonym L1 cache line to the instruction cache of the L2 cache, thereby redirecting a subsequent fetch request to the L2 instruction cache for fetching the contents of the synonym L1 cache line from the L2 instruction cache and for subsequently executing steps b) and c).

The predetermined maximum number of synonyms refers to a maximum number of synonym mismatches.

The second search in the L2 cache may be performed using a real physical address associated with the requested virtual memory address e.g. the physical address may be obtained by translating the virtual memory address to the physical address at the L1 cache. The second search results in a cache hit when the physical address is found. The found physical address is associated with the synonym index, which is an index associated with another (e.g. previously requested) virtual memory address that points to the first level cache line (i.e. the synonym L1 cache line).

The synonym mismatch may occur when the second search results in a cache hit. The second search may be performed in parallel to a search in the L2 instruction cache that leads to a cache miss.

These features may alleviate the synonym thrashing penalty incurred by repeatedly fetching the content associated with a same real or physical address with different synonyms. They may, thus, avoid a significant performance degradation that may be experienced relative to a design where the data can always be served from the L3 cache. In the present method, the data can be returned from the L2 instruction cache instead of having to take the additional latency and bandwidth limitation of each synonym re-fetch having to go out to L3 cache.

According to one embodiment, the physical indexed L2 cache performs reverse translation of a real address back to a virtual address, wherein the L2 data cache directory is indexed with the real address and keeps a synonym index based on a corresponding virtual address for every entry of the L1 cache.

According to a further embodiment, the L3 cache comprises a unified L3 data and L3 instruction cache.

According to one embodiment, the directory entry further comprises least recently used (LRU) bits indicative of a least recently used cache line for data replacement, wherein the copying of step c) comprises modifying the LRU bits of the directory entry for indicating the synonym L1 cache line as a replacement cache line.

According to one embodiment, the copying of step d) comprises modifying LRU bits of the directory entry for indicating a cache line of the L2 instruction cache as a replacement cache line.

For example, each directory entry comprises LRU bits, to determine the actual least recently used entry, the LRU bits of all directory entries within a congruence class are evaluated by an LRU evaluation algorithm. The result of this evaluation is used to determine which directory entry is to be replaced.

According to embodiments, the copying of step d) comprises overriding the decision of the LRU algorithm to indicate the synonym L1 cache line as a replacement cache line.

These embodiments may be seamlessly integrated in an existing multi-level cache hierarchy system in which the existing LRU decision may be used and redirected such that a copy of the cache line is easily implemented.

According to one embodiment, the copying of step c) further comprises updating the directory entry with a synonym index of the second L1 cache line; and creating a L1 directory entry in the L1 cache corresponding to the second L1 cache line.

The synonym index of the second L1 cache line may be generated using the requested virtual memory address.

According to one embodiment, the synonym index comprises at least one bit of the virtual part of the virtual address, wherein the maximum number of synonyms may be determined based on the synonym index. Max number may be the number of virtual address bits used to index L1, which are not always identical to the physical address bits.

According to one embodiment, the counter bits comprise at least two bits.

According to one embodiment, the fetching comprises incrementing the counter number by one.

According to one embodiment, the counter number is set to zero when the synonym L1 cache line is first copied from the L3 cache.

In another aspect, a computer program product comprising computer executable instructions to perform the method steps of the method of the preceding embodiments is provided.

Another aspect of the invention relates to a multi-level cache system comprising a first level, L1, cache being operatively connected to a second level, L2, cache split into a L2 data cache directory cache and a L2 instruction cache, wherein the L2 data cache directory comprises directory entries comprising information of data currently stored in the L1 cache, the L2 cache being operatively connected to a third level, L3, cache, wherein the first level cache is virtually indexed while the second and third levels are physically indexed, the multi-level cache system further comprising:

a L1 controller in the L1 cache configured to perform a first search in the L1 cache for a requested virtual memory address, wherein the virtual memory address corresponds to a physical memory address tag at a second L1 cache line;

a L2 controller in the L2 cache configured to:
  allocate counter bits in a directory entry of the L2 data cache directory for storing a counter number, wherein the directory entry corresponds to at least one first L1 cache line;
  in case the first search results in a cache miss, performing a second search in the L2 cache to locate a synonym index of a synonym L1 cache line corresponding to the requested virtual memory address, wherein the synonym L1 cache line is the at least one first L1 cache line; and
    a. sending a fetch request to the L3 cache for fetching contents of the synonym L1 cache line from the L3 cache, thereby incrementing the counter number;
    b. invalidating the synonym first-level cache line in the directory entry and in a L1 directory entry of the L1 cache corresponding to the synonym L1 cache line;
    c. copying the fetched contents to the second L1 cache line;
  in response to a determination that the counter number is equal to a predetermined maximum number of synonyms:
    d. copying the contents of the synonym first-level cache line to the instruction cache of the L2 cache, thereby redirecting a subsequent fetch request to the L2 instruction cache for fetching the contents of the synonym L1 cache line from the L2 instruction cache and for subsequently executing steps b) and c).

According to one embodiment, the L2 cache comprises a Fetch control register for storing and incrementing the counter number, wherein the fetching comprises loading the incremented counter number of the fetch control register and storing the counter number in the allocated counter bits.

For example, the Fetch Control Register may be required to control fetches to the L3. It may hold the information that is needed to track a fetch request that was sent to L3, and install the cache line data and directory entry on receipt of the cache line. In addition, the fetch control register provides the place to store the counter number—because it may be required when updating the directory with the incremented counter.

According to one embodiment, the L2 data cache directory comprises at least 2 counter bits.

According to further embodiments, the L1 cache is split into a L1 data cache and L1 instruction cache, wherein the L2 data cache directory is a content addressable memory or set-associative directory with one entry per cache-line of a cache array of the L1 data cache.

According to further embodiments, the L1 data cache is implemented as a multi-level structure comprising a first cache array and a corresponding first directory and a larger second cache array and a corresponding second directory.

According to one embodiment, the L1 instruction cache initiates requests to the L2 instruction cache and the L1 data cache initiates requests to the L2 instruction cache and to the L3 cache.

According to one embodiment, wherein a search for a requested data address is sent from a processor to the L1 data cache directory, wherein in case of a miss the L1 data cache directory sends the request to the L3 cache and to the L2 instruction cache directory, wherein in case of a hit in the L2 instruction cache directory cache-line data of the L2 instruction cache are installed in the cache array of the L1 data cache, else cache-line data of the L3 cache are installed in the cache array of the L1 data cache.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of aspects of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

What is claimed is:

1. A method for handling virtual memory address synonyms in a multi-level cache hierarchy structure, the multi-level cache hierarchy structure comprising a first level, L1 cache, the L1 cache being operatively connected to a second level, L2 cache split into a L2 data cache directory and a L2 instruction cache, wherein the L2 data cache directory comprises directory entries comprising information of data currently stored in the L1 cache, the L2 cache being operatively connected to a third level, L3 cache, the method comprising:
    allocating counter bits in a directory entry of the L2 data cache directory for storing a counter number, wherein the directory entry corresponds to at least one first L1 cache line, and wherein the first level cache is virtually indexed while the second and third levels are physically indexed;
    performing a first search in the L1 cache for a requested virtual memory address, wherein the requested virtual memory address corresponds to a physical memory address tag at a second L1 cache line;
    based on the first search resulting in a cache miss, performing a second search in the L2 cache to locate a synonym index of a synonym L1 cache line corresponding to the requested virtual memory address, wherein the synonym L1 cache line is the at least one first L1 cache line;
    based on the second search resulting in a cache hit:
        sending a fetch request to the L3 cache for fetching contents of the synonym L1 cache line from the L3 cache, wherein the counter number is incremented;
        invalidating the synonym L1 cache line in the directory entry and in a L1 directory entry of the L1 cache corresponding to the synonym L1 cache line; and
        copying the fetched contents to the second L1 cache line; and
    based on a determination that the counter number is equal to a predetermined maximum number of synonyms:
        copying the contents of the synonym L1 cache line to the L2 instruction cache of the L2 cache, wherein a subsequent fetch request is redirected to the L2 instruction cache for fetching the contents of the synonym L1 cache line from the L2 instruction cache and for subsequently executing the invalidating the synonym L1 cache line and copying the fetched contents to the second L1 cache line.

2. The method of claim 1, wherein the directory entry further comprises least recently used (LRU) bits indicative of a least recently used cache line for data replacement, wherein the copying the fetched contents of the second L1 cache line comprises modifying the LRU bits of the directory entry for indicating the synonym L1 cache line as a replacement cache line.

3. The method of claim 1, wherein the copying the contents of the synonym L1 cache line comprises modifying LRU bits of the directory entry for indicating a cache line of the L2 instruction cache as a replacement cache line.

4. The method of claim 1, wherein the copying the fetched contents to the second L1 cache line further comprises:
    updating the directory entry with a synonym index of the second L1 cache line; and
    creating a L1 directory entry in the L1 cache corresponding to the second L1 cache line.

5. The method of claim 1, wherein the synonym index comprises at least one bit, b, of a virtual part of the requested virtual memory address, wherein the maximum number of synonyms is determined based on the synonym index.

6. The method of claim 1, wherein the counter bits comprise at least two bits.

7. The method of claim 1, wherein the fetching comprises incrementing the counter number by one.

8. The method of claim 1, wherein the counter number is set to zero when the synonym L1 cache line is first copied from the L3 cache.

9. A multi-level cache system comprising a first level, L1 cache being operatively connected to a second level, L2 cache split into a L2 data cache directory and a L2 instruction cache, wherein the L2 data cache directory comprises directory entries comprising information of data currently stored in the L1 cache, the L2 cache being operatively connected to a third level, L3 cache, the multi-level cache system comprising:
 a L1 controller in the L1 cache configured to perform a first search in the L1 cache for a requested virtual memory address, wherein the requested virtual memory address corresponds to a physical memory address tag at a second L1 cache line, wherein the first level cache is virtually indexed while the second and third levels are physically indexed;
 a L2 controller in the L2 cache configured to:
  allocate counter bits in a directory entry of the L2 data cache directory for storing a counter number, wherein the directory entry corresponds to at least one first L1 cache line;
  based on the first search resulting in a cache miss, performing a second search in the L2 cache to locate a synonym index of a synonym L1 cache line corresponding to the requested virtual memory address, wherein the synonym L1 cache line is the at least one first L1 cache line; and
  based on the second search resulting in a cache hit:
   sending a fetch request to the L3 cache for fetching contents of the synonym L1 cache line from the L3 cache, wherein the counter number is incremented;
   invalidating the synonym L1 cache line in the directory entry and in a L1 directory entry of the L1 cache corresponding to the synonym L1 cache line; and
   copying the fetched contents to the second L1 cache line; and
  based on a determination that the counter number is equal to a predetermined maximum number of synonyms:
   copying the contents of the synonym L1 cache line to the L2 instruction cache of the L2 cache, wherein a subsequent fetch request is redirected to the L2 instruction cache for fetching the contents of the synonym L1 cache line from the L2 instruction cache and for subsequently executing the invalidating the synonym L1 cache line and copying the fetched contents to the second L1 cache line.

10. The multi-level cache system of claim 9, wherein the L2 cache comprises a fetch control register for storing and incrementing the counter number, wherein the fetching comprises loading the incremented counter number of the fetch control register and storing said counter number in the allocated counter bits.

11. The multi-level cache system of claim 9, wherein the L2 data cache directory comprises at least 2 counter bits.

12. The multi-level cache system of claim 9, wherein the directory entry further comprises least recently used (LRU) bits indicative of a least recently used cache line for data replacement, wherein the copying the fetched contents of the second L1 cache line comprises modifying the LRU bits of the directory entry for indicating the synonym L1 cache line as a replacement cache line.

13. A computer program product for handling virtual memory address synonyms in a multi-level cache hierarchy structure, the multi-level cache hierarchy structure comprising a first level, L1 cache, the L1 cache being operatively connected to a second level, L2 cache split into a L2 data cache directory and a L2 instruction cache, wherein the L2 data cache directory comprises directory entries comprising information of data currently stored in the L1 cache, the L2 cache being operatively connected to a third level, L3 cache, the computer program product comprising:
 a non-transitory computer readable storage medium readable by a processing circuit and storing instructions for execution by the processing circuit for performing a method comprising:
  allocating counter bits in a directory entry of the L2 data cache directory for storing a counter number, wherein the directory entry corresponds to at least one first L1 cache line, and wherein the first level cache is virtually indexed while the second and third levels are physically indexed;
  performing a first search in the L1 cache for a requested virtual memory address, wherein the requested virtual memory address corresponds to a physical memory address tag at a second L1 cache line;
  based on the first search resulting in a cache miss, performing a second search in the L2 cache to locate a synonym index of a synonym L1 cache line corresponding to the requested virtual memory address, wherein the synonym L1 cache line is the at least one first L1 cache line;
  based on the second search resulting in a cache hit:
   sending a fetch request to the L3 cache for fetching contents of the synonym L1 cache line from the L3 cache, wherein the counter number is incremented;
   invalidating the synonym L1 cache line in the directory entry and in a L1 directory entry of the L1 cache corresponding to the synonym L1 cache line; and
   copying the fetched contents to the second L1 cache line; and
  based on a determination that the counter number is equal to a predetermined maximum number of synonyms:
   copying the contents of the synonym L1 cache line to the L2 instruction cache of the L2 cache, wherein a subsequent fetch request is redirected to the L2 instruction cache for fetching the contents of the synonym L1 cache line from the L2 instruction cache and for subsequently executing the invalidating the synonym L1 cache line and copying the fetched contents to the second L1 cache line.

14. The computer program product of claim 13, wherein the directory entry further comprises least recently used (LRU) bits indicative of a least recently used cache line for data replacement, wherein the copying the fetched contents of the second L1 cache line comprises modifying the LRU bits of the directory entry for indicating the synonym L1 cache line as a replacement cache line.

15. The computer program product of claim 13, wherein the copying the contents of the synonym L1 cache line comprises modifying LRU bits of the directory entry for indicating a cache line of the L2 instruction cache as a replacement cache line.

16. The computer program product of claim 13, wherein the copying the fetched contents to the second L1 cache line further comprises:
   updating the directory entry with a synonym index of the second L1 cache line; and
   creating a L1 directory entry in the L1 cache corresponding to the second L1 cache line.

17. The computer program product of claim 13, wherein the synonym index comprises at least one bit, b, of a virtual part of the requested virtual memory address, wherein the maximum number of synonyms is determined based on the synonym index.

18. The computer program product of claim 13, wherein the counter bits comprise at least two bits.

19. The computer program product of claim 13, wherein the fetching comprises incrementing the counter number by one.

20. The computer program product of claim 13, wherein the counter number is set to zero when the synonym L1 cache line is first copied from the L3 cache.

* * * * *